United States Patent [19]
Tajiri et al.

[11] Patent Number: 5,704,635
[45] Date of Patent: Jan. 6, 1998

[54] AIR BAG COVER HOLDING STRUCTURE

[75] Inventors: Yuji Tajiri; Tsutomu Muraoka, both of Aichi-ken, Japan

[73] Assignee: Kabushiki Kaisha Tokai-Rika-Denki-Seisakusho, Aichi-ken, Japan

[21] Appl. No.: 606,341

[22] Filed: Feb. 23, 1996

[30] Foreign Application Priority Data

Mar. 15, 1995 [JP] Japan ................ 7-055673
Jun. 15, 1995 [JP] Japan ................ 7-149165

[51] Int. Cl.$^6$ ................................ B60R 21/20
[52] U.S. Cl. ................ 280/728.2; 280/728.3; 220/786; 220/788
[58] Field of Search ............... 280/728.3, 728.2, 280/731, 732, 730.1, 728.1; 220/780, 784, 786, 788

[56] References Cited

U.S. PATENT DOCUMENTS

| | | | |
|---|---|---|---|
| 5,064,217 | 11/1991 | Shiraki | 280/728.3 |
| 5,167,427 | 12/1992 | Baba | 280/728.3 |
| 5,280,946 | 1/1994 | Adams et al. | 280/728.2 |
| 5,435,593 | 7/1995 | Hiramitsu et al. | 280/728.2 |
| 5,520,409 | 5/1996 | Saderholm | 280/728.2 |

FOREIGN PATENT DOCUMENTS 44 14 761  11/1994  Germany ............ 280/728.2

*Primary Examiner*—Brian L. Johnson
*Assistant Examiner*—Peter C. English
*Attorney, Agent, or Firm*—Sixbey Friedman Leedom & Ferguson; Thomas W. Cole

[57] ABSTRACT

An air bag cover holding structure comprises: a plate-shaped bag holder for fixing an air bag cover to a steering wheel, the plate-shaped bag holder having engaging claws which are respectively engaged with hook-shaped grooves formed on an inner peripheral wall at an open-side end of the air bag cover; a reinforcing plate fixed in a state of overlapping with the plate-shaped bag holder and having engaging portions, the engaging portions being respectively inserted in plate inserting holes which are formed at the open-side end of the air bag cover in directions crossing the hook-shaped grooves so as to hold the air bag cover together with the engaging claws; and a pull-out prevention reinforcing member provided in at least one of the engaging claws and the engaging portions to prevent the air bag cover from being pulled out from the plate-shaped bag holder and the reinforcing plate.

19 Claims, 10 Drawing Sheets

AIR BAG COVER HOLDING STRUCTURE

BACKGROUND OF THE INVENTION

1. FIELD OF THE INVENTION

The present invention relates to an air bag cover holding structure for holding a cover of an air bag apparatus provided on a steering wheel of an automobile.

2. DESCRIPTION OF THE RELATED ART

In an air bag apparatus mounted to a steering wheel of an automobile, at the time of a sudden deceleration of a vehicle, a bag is inflated due to the gas generated by an inflator and is interposed between the steering wheel and a vehicle occupant. An air bag cover for covering the bag and the inflator is fixed to a base plate and the base plate is mounted to a hub of the steering wheel.

The air bag cover is subjected to expansional shock which occurs when the air bag cover is broken and the bag expands and inflates. Accordingly, it is necessary to sufficiently maintain the strength of a portion of the air bag cover which is fixed to the base plate. For this reason, there have been disclosed a structure in which a frame-shaped core metallic member is integrally formed with a peripheral edge at an opening side of the air bag cover by insert molding, a structure for holding the air bag cover by a plate-shaped bag holder and a reinforcing plate which is fixed in a state of overlapping with the plate-shaped bag holder, and the like.

The air bag cover held by the plate-shaped bag holder and the reinforcing plate is shown in FIG. 10. A hook-shaped groove 72 having an L-shaped cross-sectional configuration is formed on an inner peripheral wall 70A at an open-side end of an air bag cover 70 with an end of the hook-shaped groove 72 being directed toward an open-side end portion 70B of the air bag cover 70. A plate inserting hole 74 is formed in the open-side end portion 70B of the air bag cover 70 along a direction crossing the hook-shaped groove 72 so as to face the end 72A of the hook-shaped groove 72. Further, an engaging claw 77 of a plate-shaped bag holder 76 is engaged with the hook-shaped groove 72 and an engaging portion 78A of a reinforcing plate 78 is inserted in the plate inserting hole 74. As a result, the air bag cover 70 is held.

However, with this air bag cover holding structure, from the time after generation of gas begins for expansion of an air bag body till the air bag cover opens, load which acts in a direction in which an interval between the engaging claw 77 and the engaging portion 78A of the reinforcing plate 78 is widened (i.e., the direction indicated by arrow F1 in FIG. 10) is generated in a support portion 70C of the air bag cover 70. Thereafter, synchronous with expansion of the air bag cover 70, load which acts in a direction in which the support portion 70C is pulled out from a position between the engaging claw 77 and the engaging portion 78A of the reinforcing plate 78 (i.e., the direction indicated by arrow F2 in FIG. 10) is generated in the support portion 70C of the air bag cover. 70. For this reason, force is applied in the direction in which the support portion 70C of the air bag cover 70 is pulled out from the position between the engaging claw 77 and the engaging portion 78A of the reinforcing plate 78. In order to prevent this situation, it is necessary to increase each thickness of the plate-shaped bag holder 76 and the reinforcing plate 78, which results in an increase in weight of an air bag apparatus.

SUMMARY OF THE INVENTION

In view of the above-described circumstances, it is an object of the present invention to provide an air bag cover holding structure which can maintain the holding strength which is sufficient to withstand great expansional shock without increasing the weight of an air bag apparatus.

A first aspect of the present invention is an air bag cover holding structure which comprises: a plate-shaped bag holder for fixing an air bag cover to a steering wheel, the plate-shaped bag holder having engaging claws which are respectively engaged with hook-shaped grooves formed on an inner peripheral wall at an open-side end of the air bag cover; a reinforcing plate fixed in a state of overlapping with the plate-shaped bag holder and having engaging portions, the engaging portions being respectively inserted in plate inserting holes which are formed at the open-side end of the air bag cover in directions crossing the hook-shaped grooves so as to hold the air bag cover together with the engaging claws; and a pull-out prevention reinforcing member provided in at least one of the engaging claws and the engaging portions to prevent the air bag cover from being pulled out from the plate-shaped bag holder and the reinforcing plate.

A second aspect of the present invention is an air bag cover holding structure which comprises: a plate-shaped bag holder for fixing an air bag cover to a steering wheel, the plate-shaped bag holder having engaging claws which are respectively engaged with hook-shaped grooves formed on an inner peripheral wall at an open-side end of the air bag cover; a reinforcing plate fixed in a state of overlapping with the plate-shaped bag holder and having engaging portions, the engaging portions being respectively inserted in plate inserting holes which are formed at the open-side end of the air bag cover in directions crossing the hook-shaped grooves so as to hold the air bag cover together with the engaging claws; and a pull-out prevention reinforcing projections and recesses provided in at least one of ends of the engaging claws and ends of the engaging portions and formed to bite into the air bag cover to reinforce to prevent the air bag cover from being pulled out from the plate-shaped bag holder and the reinforcing plate.

A third aspect of the present invention is an air bag cover holding structure which comprises: a plate-shaped bag holder for fixing an air bag cover to a steering wheel, the plate-shaped bag holder having engaging claws which are respectively engaged with hook-shaped grooves formed on an inner peripheral wall at an open-side end of the air bag cover; a reinforcing plate fixed in a state of overlapping with the plate-shaped bag holder and having engaging portions, the engaging portions being respectively inserted in plate inserting holes which are formed at the open-side end of the air bag cover in directions crossing the hook-shaped grooves so as to hold the air bag cover together with the engaging claws; and pull-out prevention reinforcing projections provided on at least one of holding surfaces of the plate-shaped bag holder and holding surfaces of the reinforcing plate and formed to bite into the air bag cover to reinforce to prevent the air bag cover from being pulled out from the plate-shaped bag holder and the reinforcing plate, each of the holding surfaces of the plate-shaped bag holder and each of the holding surfaces of the reinforcing plate being provided to face to each other with the air bag cover interposed therebetween.

A fourth aspect of the present invention is an air bag cover holding structure which comprises: a plate-shaped bag holder for fixing an air bag cover to a steering wheel, the plate-shaped bag holder having engaging claws which are respectively engaged with hook-shaped grooves formed on an inner peripheral wall at an open-side end of the air bag cover; a reinforcing plate fixed in a state of overlapping with the plate-shaped bag holder and having engaging portions, the engaging portions being respectively inserted in plate inserting holes which are formed at the open-side end of the air bag cover in directions crossing the hook-shaped grooves so as to hold the air bag cover together with the engaging claws; and a pull-out prevention reinforcing member for reinforcing to prevent the air bag cover from being pulled out from the plate-shaped bag holder and the reinforcing plate, the pull-out prevention reinforcing member including convex portions formed at an end of each of the engaging portions and engaging holes formed in each of the engaging claws and the convex portions being provided to pass through through holes formed in the air bag cover and to be inserted in the engaging holes.

A fifth aspect of the present invention is an air bag cover holding structure which, in the fourth aspect of the present invention, further comprises a pull-out preventing member provided in each of the convex portions to prevent the convex portion from being pulled out from one of the engaging holes.

In accordance with the air bag cover holding structure of the first aspect of the present invention, even when the air bag cover is subjected to load which widens the interval between each of the engaging claws of the plate-shaped bag holder and each of the engaging portions of the reinforcing plate to cause the air bag cover from being pulled out from the position between the engaging claws and the engaging portions, the pull-out prevention reinforcing member is provided in at least one of the engaging claws and the engaging portions and it is accordingly possible to prevent the air bag cover from being pulled out from the plate-shaped bag holder and the reinforcing plate.

In accordance with the air bag cover holding structure of the second aspect of the present invention, even when the air bag cover is subjected to load which widens the interval between each of the engaging claws of the plate-shaped bag holder and each of the engaging portions of the reinforcing plate to cause the air bag cover from being pulled out from the position between the engaging claws and the engaging portions, the pull-out prevention reinforcing projections and recesses which are formed in at least one of the ends of the engaging claws and the ends of the engaging portions bite into the air bag cover so as to reinforce to prevent the air bag cover from being pulled out from the position between the engaging claws of the plate-shaped bag holder and the engaging portions of the reinforcing plate.

In accordance with the air bag cover holding structure of the third aspect of the present invention, even when the air bag cover is subjected to load which widens the interval between each of the engaging claws of the plate-shaped bag holder and each of the engaging portions of the reinforcing plate to cause the air bag cover from being pulled out from the position between the engaging claws and the engaging portions, the pull-out prevention reinforcing projections which are formed on at least one of the holding surfaces of the plate-shaped bag holder and the holding surfaces of the reinforcing plate, these holding surfaces respectively facing to each other with the air bag cover interposed therebetween, are provided to bite into the air bag cover so as to prevent the air bag cover from being pulled out from the position between the engaging claws of the plate-shaped bag holder and the engaging portions of the reinforcing plate.

In accordance with the air bag cover holding structure of the fourth embodiment of the present invention, even when the air bag cover is subjected to load which widens the interval between each of the engaging claws of the plate-shaped bag holder and each of the engaging portions of the reinforcing plate to cause the air bag cover from being pulled out from the position between the engaging claws and the engaging portions, the convex portions formed at the end of each of the engaging portions are respectively inserted in the engaging holes formed in each of the engaging claws through the through holes formed in the air bag cover and a support portion of the air bag cover is enclosed in a box-shaped configuration formed by the plate-shaped bag holder and the reinforcing plate when seen from the cross-sectional view. For this reason, it is possible to restrain widening of the interval between each of the engaging claws of the plate-shaped bag holder and each of the engaging portions of the reinforcing plate so as to prevent the air bag cover from being pulled out from the position between the engaging claws of the plate-shaped bag cover and the engaging portions of the reinforcing plate.

In accordance with the air bag cover holding structure of the fifth embodiment of the present invention, when the air bag cover is subjected to load which widens the interval between each of the engaging claws of the plate-shaped bag holder and each of the engaging portions of the reinforcing plate to cause the air bag cover from being pulled out from the position between the engaging claws and the engaging portions, the convex portion is not pulled out from the engaging hole due to the pull-out preventing member formed in the convex portion and the interval between each of the engaging claws of the plate-shaped bag holder and each of the engaging portions of the reinforcing plate accordingly is not widened. For this reason, it is possible to prevent the air bag cover from being pulled out from the position between the engaging claws of the plate-shaped bag holder and the engaging portions of the reinforcing plate.

As described above, since the air bag cover holding structure according to the first aspect of the present invention is constructed in that the pull-out prevention reinforcing member is formed in at least one of the engaging claws and the engaging portions, it has an excellent effect of making it possible to maintain the holding strength which is sufficient to withstand great expansional shock without increasing the weight of an air bag apparatus.

Further, since the air bag cover holding structure according to the second aspect of the present invention is constructed in that the pull-out prevention reinforcing projections and recesses provided to bite into the air bag cover is formed in at least one of the end of each of the engaging claws of the plate-shaped bag holder and the end of each of the engaging portions of the reinforcing plate, it has an excellent effect of making it possible to maintain the holding strength which is sufficient to withstand great expansional shock without increasing the weight of the apparatus.

Since the air bag cover holding structure according to the third aspect of the present invention is constructed in that the pull-out prevention reinforcing projections provided to bite into the air bag cover are formed on at least one of the holding surfaces of the plate-shaped bag holder and the holding surfaces of the reinforcing plate, these holding surfaces respectively facing to each other with the air bag cover interposed therebetween, it has an excellent effect of making it possible to maintain the holding strength which is sufficient to withstand great expansional shock without increasing the weight of the apparatus.

Since the air bag cover holding structure according to the fourth aspect of the present invention is constructed in that the convex portions formed at the end of each of the engaging portions are respectively inserted in the engaging holes formed in each of the engaging claws through the through holes formed in the air bag cover, it has an excellent effect of making it possible to maintain the holding strength which is sufficient to withstand great expansional shock without increasing the weight of the apparatus.

Since the air bag cover holding structure according to the fifth aspect of the present invention is constructed in that the pull-out preventing member is provided in each of the convex portions to prevent the convex portion from being pulled out from one of the engaging holes, it has an excellent effect of making it possible to maintain the holding strength which is sufficient to withstand great expansional shock without increasing the weight of the apparatus.

DESCRIPTION OF THE PREFERRED EMBODIMENTS

Figure 1:
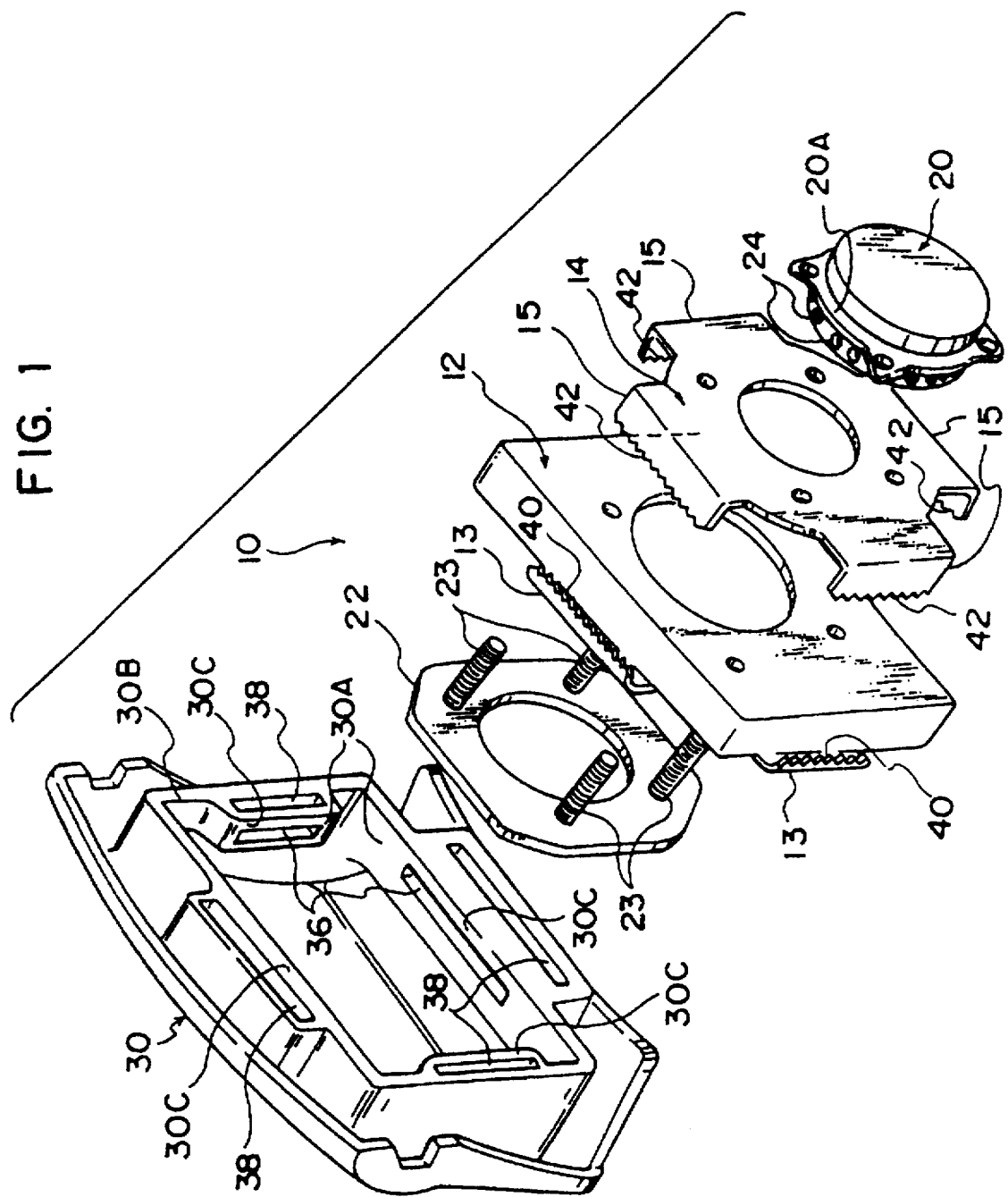
FIG. 1 is a perspective view showing a principal portion of an air bag apparatus to which an air bag cover holding structure according to a first embodiment of the present invention is applied.
Figure 2:
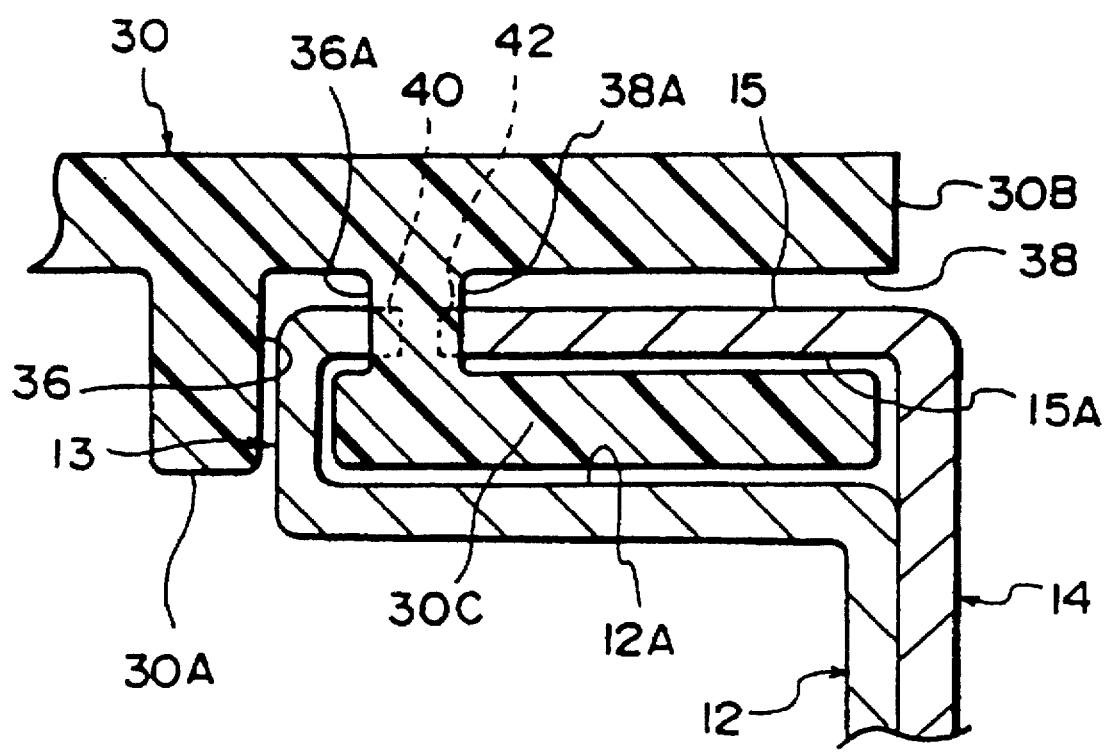
FIG. 2 is a cross-sectional view showing details of the air bag cover holding structure according to the first embodiment.
Figure 3:
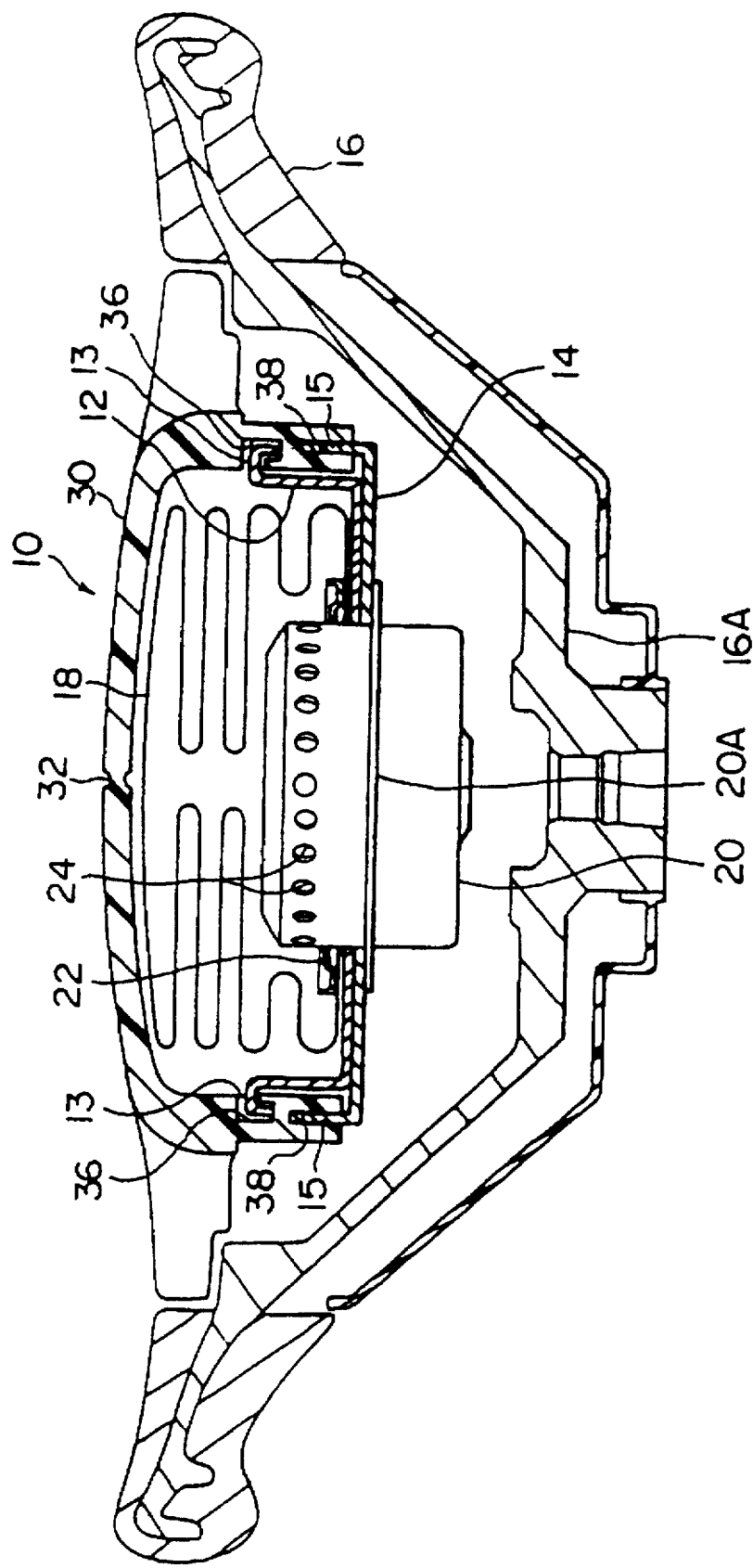
FIG. 3 is a cross-sectional view showing an overall construction of the air bag apparatus to which the air bag cover holding structure according to the first embodiment is applied.

Referring now to FIGS. 1 through 3, a description will be hereinafter given of an air bag cover holding structure according to a first embodiment of the present invention.

FIG. 3 shows an overall construction of an air bag apparatus 10 for a vehicle driver's seat, to which the air bag cover holding structure according to the first embodiment of the present invention is applied. The air bag apparatus 10 includes a plate-shaped bag holder 12 and a reinforcing plate 14. A bag 18 and an inflator 20 are mounted to the plate-shaped bag holder 12 and the reinforcing plate 14.

The bag 18 is disposed in a folded state at a vehicle occupant's side of the plate-shaped bag holder 12 (i.e., at an upper side of the plate-shaped bag holder 12 on the paper of FIG. 3). An open-side edge of the bag 18 is mounted substantially at a central portion of the plate-shaped bag holder 12 via a ring plate 22. The ring plate 22 is fastened to the plate-shaped bag holder 12 by bolts 23 (FIG. 1) and nips the open-side edge of the bag 18 together with the plate-shaped bag holder 12.

As shown in FIGS. 1 and 3, the inflator 20 has a columnar structure and is disposed in such a manner as to pass through respective substantially central portions of the plate-shaped bag holder 12 and the reinforcing plate 14 and to be inserted in the bag 18. A flange 20A is formed on the outer periphery of the inflator 20 and the inflator 20 is fixed by the bolts 22 to the surface of the reinforcing plate 14 opposite to the vehicle occupant's side (i.e., to the lower surface of the reinforcing plate 14 on the paper of FIG. 3). The inflator 20 is filled with a gas generating material. When the gas generating material combusts at the time of a sudden deceleration of the vehicle, a large amount of gas is generated. A plurality of gas holes 24 are formed on the circumferential surface of the inflator 20 further at the vehicle occupant's side than the flange 20A and gas generated due to combustion of the gas generating material is emitted and supplied into the bag 18. The bag 18 is provided to inflate due to the gas.

An air bag cover 30 is disposed at an exterior side of the bag 18. The air bag cover 30 is made of synthetic resins (specifically, made of urethane) and is disposed at the vehicle occupant's side of the plate-shaped bag holder 12 (at the upper side of the plate-shaped bag holder 12 on the paper of FIG. 3) with the bag 18 being disposed between the plate-shaped bag holder 12 and the air bag cover 30. A thin-walled fragile portion 32 is formed in the vicinity of the top of the air bag cover 30 and is provided to be broken off by pressurized force due to inflation of the bag 18.

As shown in FIG. 1, hook-shaped grooves 36 are respectively formed at upper, lower, left and right sides of an open-side end inner peripheral surface 30A of the air bag cover 30.

As illustrated in FIG. 2 in detail, the hook-shaped groove 36 has an L-shaped cross-sectional configuration with its end 36A bending toward the open-side end portion 30B of the air bag cover 30. A plate inserting hole 38 is formed in the open-side end portion 30B of the air bag cover 30 along a direction crossing the hook-shaped groove 36 in such a manner as to face the end 36A of the hook-shaped groove 36. Further, an engaging claw 13 of the plate-shaped bag holder 12 is inserted in the hook-shaped groove 36 and an engaging portion 15 of the reinforcing plate 14 is inserted in the plate inserting hole 38.

As shown in FIG. 1, a pull-out preventing sawtoothed portion 40 formed as projections and recesses for reinforcing pull-out prevention is formed at the end of the engaging claw 13 of the plate-shaped bag holder 12. A pull-out preventing sawtoothed portion 42 is formed at the end of the engaging portion 15 of the reinforcing plate 14.

As shown in FIG. 2, the plate-shaped bag holder 12 and the reinforcing plate 14 are fixed in an overlapping manner and a holding surface 12A of the plate-shaped bag holder 12 and a holding surface 15A of the engaging portion 15 of the reinforcing plate 14 are provided to face to each other with a support portion 30C of the air bag cover 30 interposed therebetween. Convex portions of the pull-out preventing sawtoothed portion 40 formed at the end of the engaging claw 13 of the plate-shaped bag holder 12 bite into the end portion 36A of the hook-shaped groove 36 of the air bag cover 30. Further, convex portions of the pull-out preventing sawtoothed portion 42 formed at the end of the engaging portion 15 of the reinforcing plate 14 bite into a bottom portion 38A of the plate inserting hole 38 of the air bag cover 30. As a result, the air bag cover 30 is held.

As shown in FIG. 3, the plate-shaped bag holder 12 and the reinforcing plate 14 are held by a hub 16A (core metallic portion) of a steering wheel 16 via an unillustrated stay or the like.

Next, an operation of the first embodiment will be described.

In the air bag apparatus 10 having the above-described structure, at the time of a sudden deceleration of the vehicle, when the inflator 20 operates, gas is supplied into the bag 18 and the bag 18 is accordingly inflated. When the air bag cover 30 is subjected to pressure from an interior side thereof due to inflation of the bag 18 and the thin-walled fragile portion 32 of the air bag cover 30 is broken off by the pressurized force, the air bag cover 30 is unfolded largely. Synchronous with unfolding of the air bag cover 30, the bag 18 projects out of the air bag cover 30 and is interposed between the steering wheel 18 and the vehicle occupant so as to absorb shock to be applied to the vehicle occupant.

At this time, the air bag cover 30 may be subjected to load which widens an interval between the engaging claw 13 of the plate-shaped bag holder 12 and the engaging portion 15 of the reinforcing plate 14 to cause the support portion 30C to be pulled out from a position between the engaging claw 13 and the engaging portion 15. However, since the convex portions of the pull-out preventing sawtoothed portion 40 formed at the end of the engaging claw 13 of the plate-shaped bag holder 12 bite into the end portion 36A of the hook-shaped groove 36 of the air bag cover 30 and the convex portions of the pull-out preventing sawtoothed portion 42 formed at the end of the engaging portion 15 of the reinforcing plate 14 bite into the bottom portion 38A of the plate inserting hole 38 of the air bag cover 30, the support portion 30C of the air bag cover 30 can be prevented from being pulled out from the position between the engaging claw 13 of the plate-shaped bag holder 12 and the engaging portion 15 of the reinforcing plate 14. As a result, the air bag cover 30 is reliably held.

As described above, the air bag apparatus 10 to which the air bag cover holding structure according to the first embodiment is applied is constructed in that the pull-out preventing sawtoothed portion 40 is formed in the engaging claw 13 of the plate-shaped bag holder 12 so as to bite into the air bag cover 30 and the pull-out preventing sawtoothed portion 42 is formed in the engaging portion 15 of the reinforcing plate 14 so as to bite into the air bag cover 30. For this reason, it is not necessary to increase respective thicknesses of the plate-shaped bag holder 12 and the reinforcing plate 14 and it is possible to maintain the holding strength which is sufficient to withstand great expansional shock without increasing the weight of the apparatus.

Meanwhile, in the first embodiment, the pull-out preventing sawtoothed portion 40 is formed in the engaging claw 13 of the plate-shaped bag holder 12 in such a manner as to bite into the air bag cover 30 and the pull-out preventing sawtoothed portion 42 is formed in the engaging portion 15 of the reinforcing plate 14 in such a manner as to bite into the air bag cover 30. However, the present invention is not limited to the same and a pull-out preventing sawtoothed portion provided to bite into the air bag cover 30 may be formed only at any one of the engaging claw 13 of the plate-shaped bag holder 12 and the engaging portion 15 of the reinforcing plate 14.

Further, the shape of the pall-out preventing projections and recesses formed to bite into the air bag cover 30 is not limited to the sawtoothed configuration and other configuration may be applied.

A description will be hereinafter given of an air bag cover holding structure according to a second embodiment of the present invention with reference to FIGS. 4 and 5.

It should be noted that the same members as those of the first embodiment will be denoted by the same reference numerals, and a description thereof will be omitted.

Figure 4:
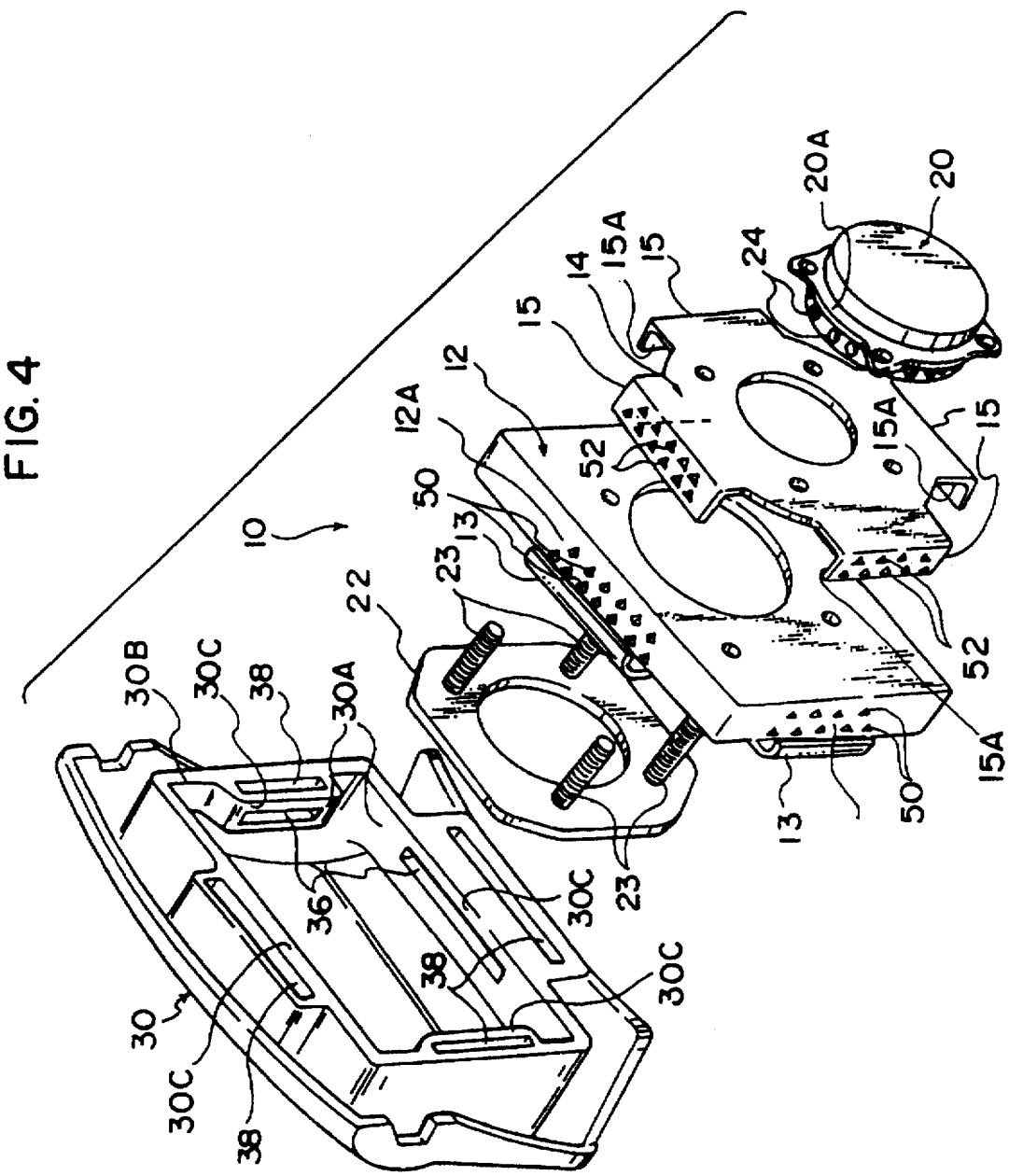
FIG. 4 is a perspective view showing a principal portion of an air bag apparatus to which an air bag cover holding structure according to a second embodiment of the present invention is applied.

As shown in FIG. 4, in the second embodiment of the present invention, a plurality of pull-out preventing projections 50 which serve as projections for reinforcing pull-out prevention are formed on the holding surface 12A of the plate-shaped bag holder 12 and a plurality of pull-out preventing projections 52 which serve as projections for reinforcing pull-out prevention are formed on the holding surface 15A of the engaging portion 15 of the reinforcing plate 14.

Figure 5:
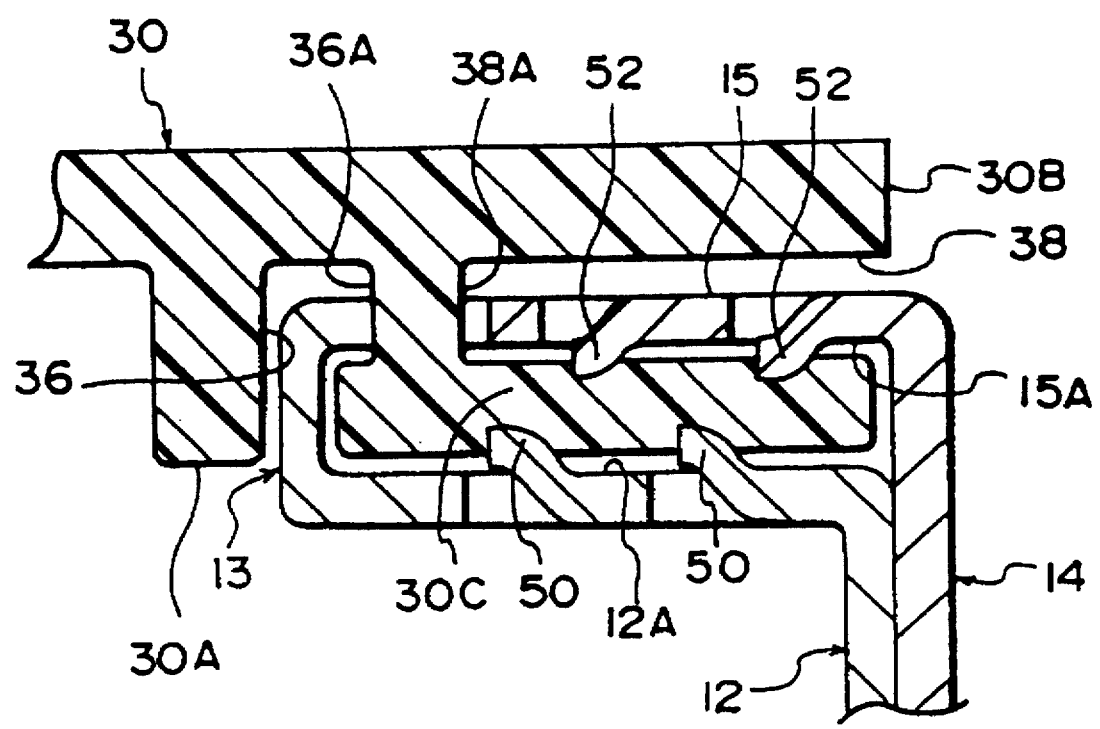
FIG. 5 is a cross-sectional view showing details of the air bag cover holding structure according to the second embodiment.

As shown in FIG. 5, these pull-out preventing projections 50, 52 formed as sharp edges of a grater or the like are provided to bite into the support portion 30C of the air bag cover 30 and the air bag cover 30 is accordingly held.

Next, an operation of the second embodiment will be described.

In the second embodiment, even when the air bag cover 30 is subjected to load which widens an interval between the engaging claw 13 of the plate-shaped bag holder 12 and the engaging portion 15 of the reinforcing plate 14 to cause the support portion 30C to be pulled out from the position between the engaging claw 13 and the engaging portion 15, since the pull-out preventing projections 50, 52 respectively formed on the holding surface 12A of the plate-shaped bag holder 12 and on the holding surface 15A of the engaging portion 15 of the reinforcing plate 14 are provided to bite into the air bag cover 30, the support portion 30C of the air bag cover 30 can be prevented from being pulled out from the position between the engaging claw 13 of the plate-shaped bag holder 12 and the engaging portion 15 of the reinforcing plate 14. As a result, the air bag cover 30 is reliably held.

As described above, the air bag apparatus 10 to which the air bag cover holding structure according to the second embodiment is applied is constructed in that the pull-out preventing projections 50, 52 provided to bite into the air bag cover 30 are respectively formed on the holding surface 12A of the plate-shaped bag holder 12 and on the holding surface 15A of the engaging portion 15 of the reinforcing plate 14, the holding surface 12A and the holding surface 15A being provided to face each other with the support portion 30C of the air bag cower 30 interposed therebetween. Accordingly, it is not necessary to increase respective thicknesses of the plate-shaped bag holder 12 and the reinforcing plate 14 and it is possible to maintain the holding strength which is sufficient to withstand great expansional shock without increasing the weight of the apparatus.

Meanwhile, in the second embodiment, the pull-out preventing projections 50, 52 formed as sharp edges and biting into the air bag cover 30 are respectively formed on the holding surface 12A of the plate-shaped bag holder 12 and the holding surface 15A of the engaging portion 15 of the reinforcing plate 14. However, the present invention is not limited to the same, and pull-out preventing projections provided to bite into the air bag cover 30 may be formed only at any one of the holding surface 12A of the plate-shaped bag holder 12 and the holding surface 15A of the engaging portion 15 of the reinforcing plate 14.

Further, the configuration of the pull-out preventing projections provided to bite into the air bag cover 30 is not limited to those shown in FIGS. 4 and 5 and other configuration may also be applied.

Moreover, a structure of the above-described first and second embodiments combined with each other may also be applied.

A description will be hereinafter given of an air bag cover holding structure according to a third embodiment of the present invention with reference to FIGS. 6 and 7.

It should be noted that the same members as those of the first embodiment will be denoted by the same reference numerals, and a description thereof will be omitted.

Figure 6:
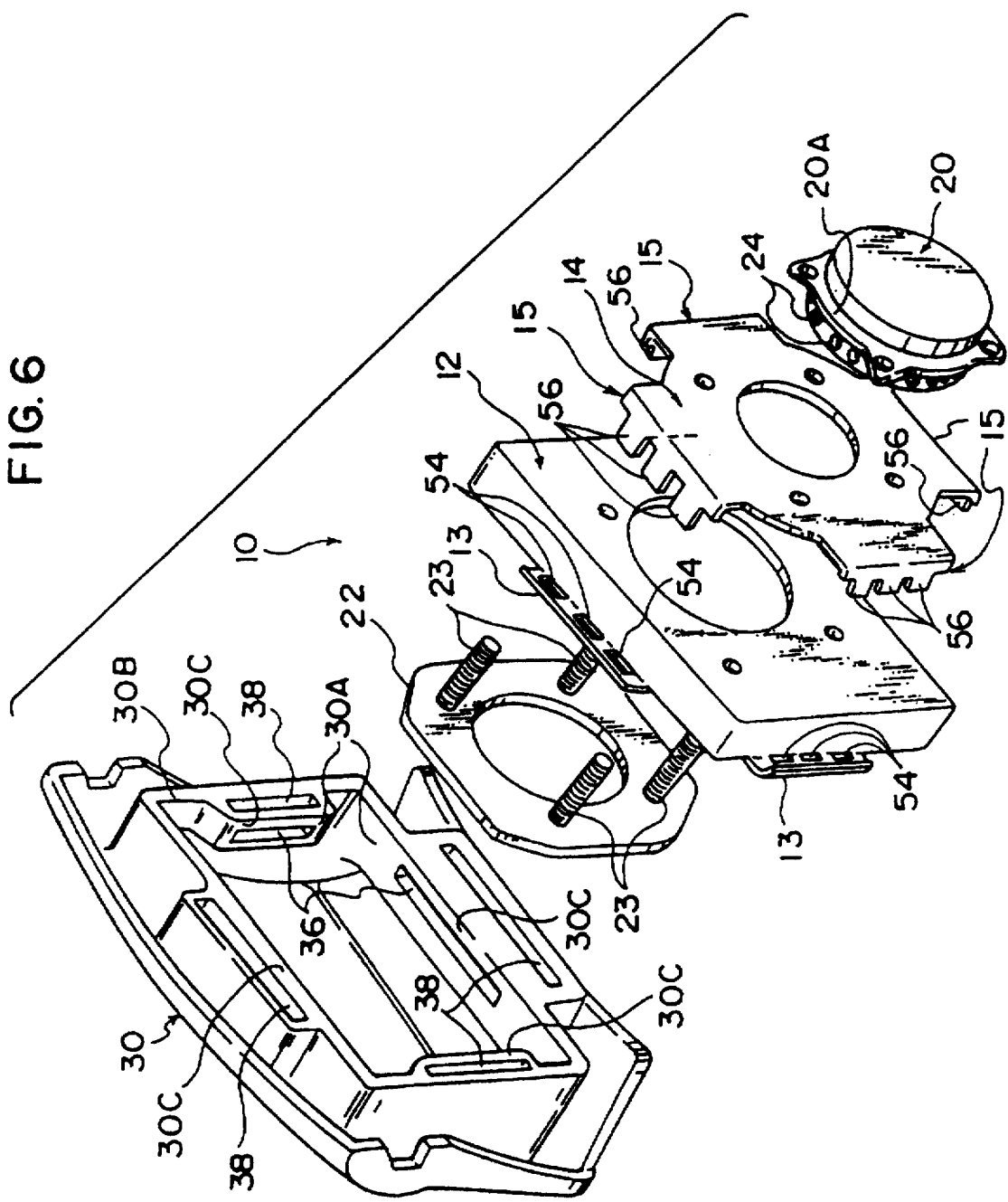
FIG. 6 is a perspective view showing a principal portion of an air bag apparatus to which an air bag cover holding structure according to a third embodiment of the present invention is applied.

As shown in FIG. 6, in the third embodiment of the present invention, a plurality of engaging holes 54 serving as members for reinforcing pull-out prevention are provided in the engaging claw 13 of the plate-shaped bag holder 12 and are formed at predetermined intervals and along a longitudinal direction of the engaging claw 13, namely, along an edge of the plate-shaped bag holder 12. Further, a plurality of protruding portions 56 serving as members for reinforcing pull-out prevention are formed at the end of the engaging portion 15 of the reinforcing plate 14 and are provided to be capable of being inserted in the engaging holes 54 of the plate-shaped bag holder 12, respectively.

Figure 7:
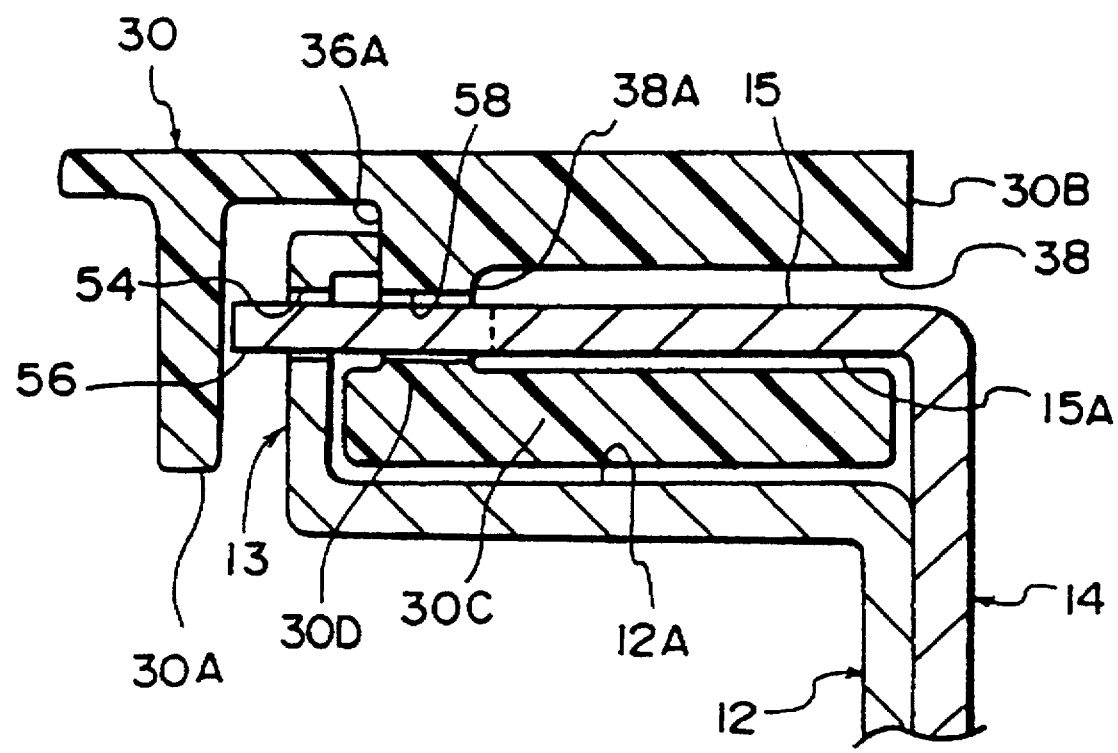
FIG. 7 is a cross-sectional view showing details of the air bag cover holding structure according to the third embodiment.

As shown in FIG. 7, a through hole 58 is formed at a neck portion 30D of the support portion 30C of the air bag cover 30, i.e., at a position between the end portion 36A of the hook-shaped groove 36 and the bottom portion 38A of the plate inserting hole 38. The protruding portions 56 of the engaging portion 15 are respectively inserted in the engaging holes 54 of the engaging claw 13 via the through holes 58.

Next, an operation of the third embodiment will be described.

The air bagcover 30 may be subjected to load which widens the interval between the engaging claw 13 of the plate-shaped bag holder 12 and the engaging portion 15 of the reinforcing plate 14 to cause the support portion 30C to be pulled out from the position between the engaging claw 13 and the engaging portion 15. However, in the third embodiment, the protruding portions 56 formed at the end of the engaging portion 15 are respectively inserted in the engaging holes 54 formed in the engaging claw 13 via the through holes 58 formed in the neck portions 30D of the support portions 30C of the air bag cover 30, and the support portion 30C of the air bag cover 30 is enclosed in a box-shaped configuration formed by the plate-shaped bag holder 12 and the reinforcing plate 14 when seen from a cross-sectional view in FIG. 7.

For this reason, when the above-described load is applied to the air bag cover 30, the protruding portion 56 interferes with an edge portion of the engaging hole 54 formed in the engaging claw 13, and the engaging claw 13 and the engaging portion 15 prevent each other's deformation. Accordingly, it is possible to prevent widening of the interval between the engaging claw 13 of the plate-shaped bag holder 12 and the engaging portion 15 of the reinforcing plate 14 and to prevent the air bag cover 30 from being pulled out from the position between the engaging claw 13 and the engaging portion 15, with the result that the air bag cover 30 is reliably held.

As described above, the air bag apparatus 10 to which the air bag cover holding structure according to the third embodiment of the present invention is applied is constructed in that the protruding portions 56 formed in the engaging portion 15 of the reinforcing plate 14 are respectively inserted in the engaging holes 54 formed in the engaging claw 13 of the plate-shaped bag holder 12 via the through holes 58 of the air bag cover 30. Accordingly, it is not necessary to increase respective thicknesses of the plate-shaped bag holder 12 and the reinforcing plate 14 and it is possible to maintain the holding strength thereof which is sufficient to withstand great expansional shock without increasing the weight of the apparatus.

Figure 8:
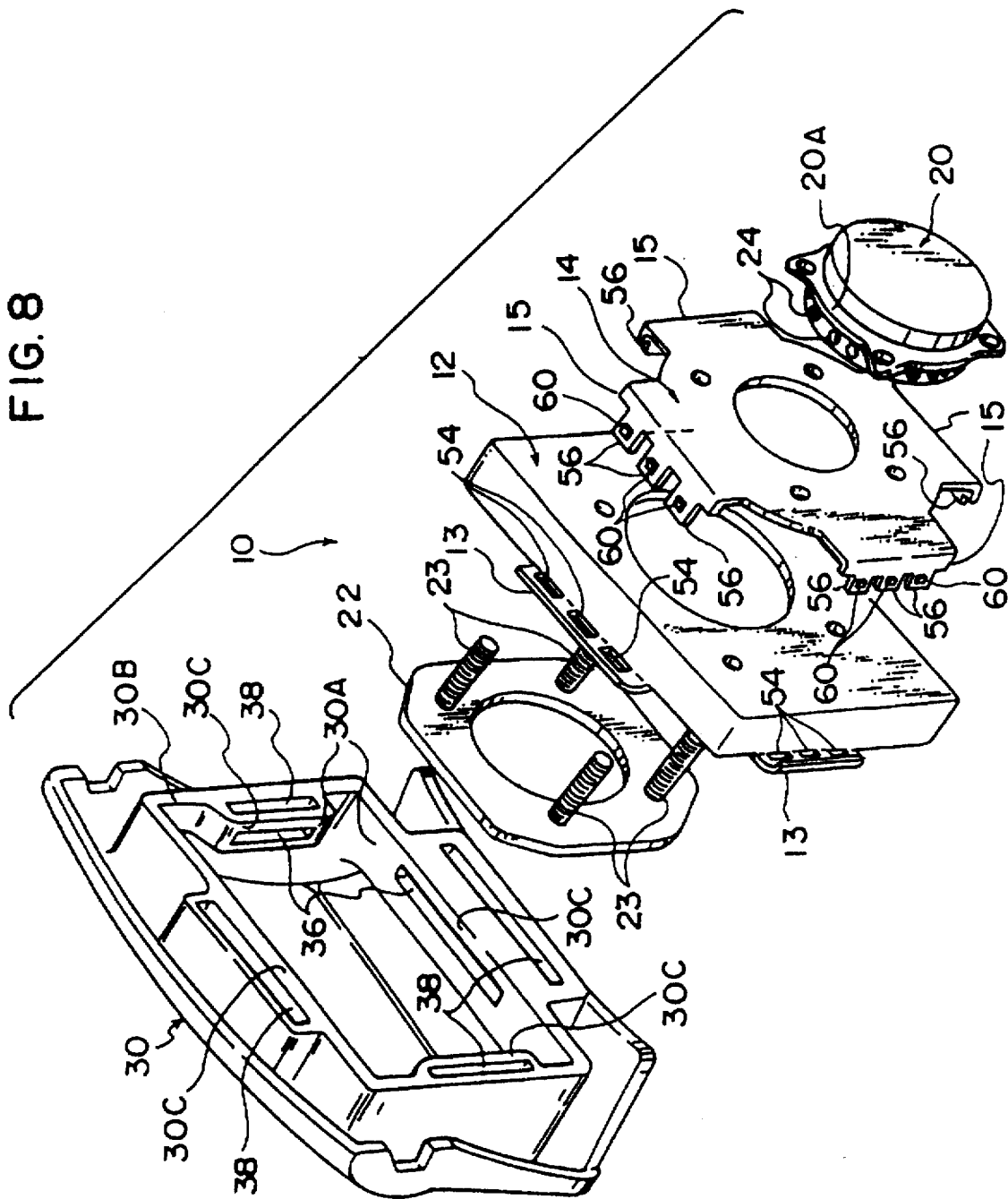
FIG. 8 is a perspective view showing a principal portion of an air bag apparatus to which an air bag cover holding structure according to a modified example of the third embodiment of the present invention is applied.
Figure 9:
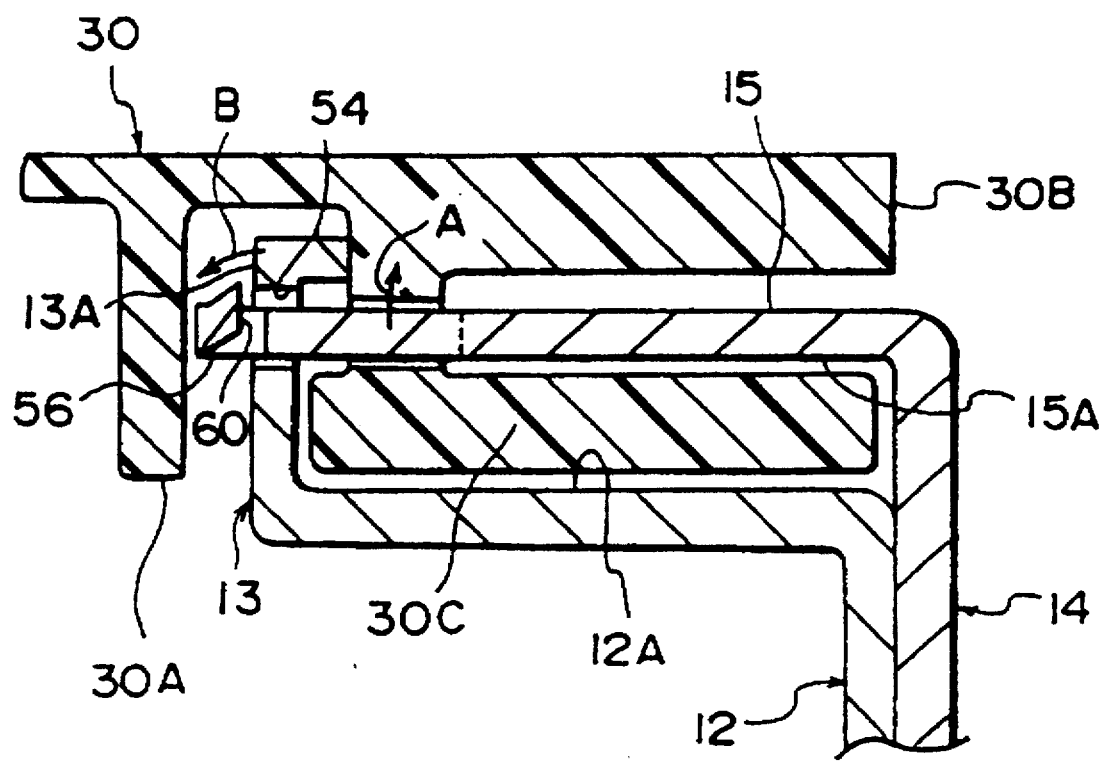
FIG. 9 is a cross-sectional view showing details of the air bag cover holding structure according to the modified example of the third embodiment.
Figure 10:
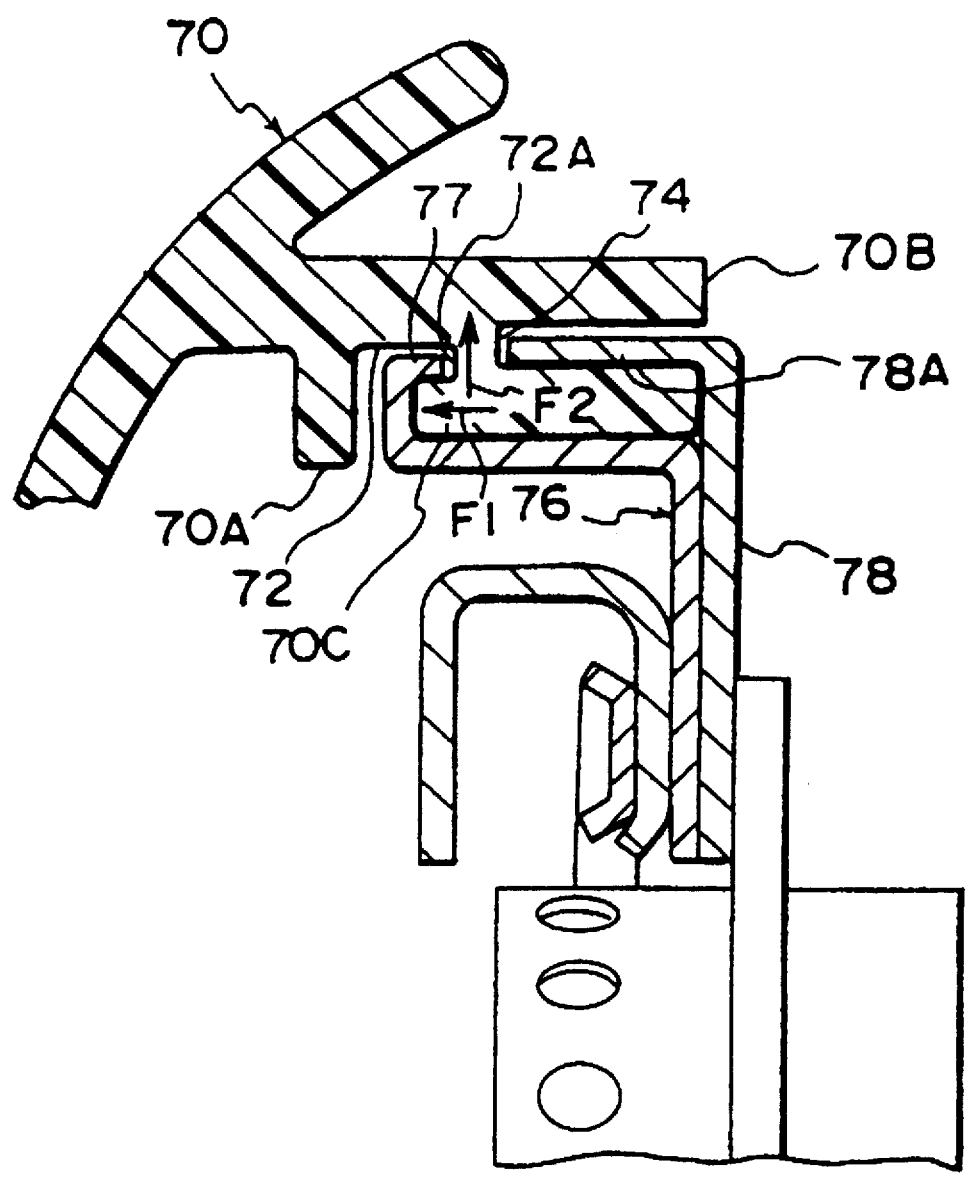
FIG. 10 is a cross-sectional view showing a principal portion of an air bag apparatus to which a conventional air bag cover holding structure is applied.

Further, as shown in FIGS. 8 and 9, a cut-raised portion 60 serving as a pull-out preventing member may be formed on the external surface at the end of the protruding portion 56. In this case, when the air bag cover 30 is subjected to load which widens the interval between the engaging claw 13 of the plate-shaped bag holder 12 and the engaging portion 15 of the reinforcing plate 14 to cause the support portion 30C to be pulled out from the position between the engaging claw 13 and the engaging portion 15, the engaging portion 15 deforms in the direction indicated by arrow A in FIG. 9 and the engaging claw 13 deforms in the direction indicated by arrow B in FIG. 9. As a result, the cut-raised portion 60 abuts against an edge portion 13A of the engaging hole 54 of the engaging claw 13, so that the engaging claw 13 and the engaging portion 15 prevent each other's deformation. For this reason, it is possible to reliably prevent the air bag cover 30 from being pulled out from the position between the engaging claw 13 of the plate-shaped bag holder 12 and the engaging portion 15 of the reinforcing plate 14.

Meanwhile, the pull-out preventing member is not limited to the cut-raised portion 60 and other configuration such as a rib may also be applied.

What is claimed is:

1. An air bag cover holding structure comprising:
   a bag holder for fixing an air bag cover to a steering wheel, said bag holder having engaging claws which are respectively engaged with hook-shaped grooves formed on an inner peripheral wall at an open-side end of the air bag cover;
   a reinforcing plate fixed in a state of overlapping with said bag holder and having engaging portions, the engaging portions being respectively inserted in plate inserting holes which are formed at the open-side end of the air bag cover in directions of respective hook-shaped grooves so as to hold the air bag cover together with the engaging claws; and
   a pull-out prevention reinforcing member provided in at least one of the engaging claws and the engaging portions to prevent the air bag cover from being pulled out from said bag holder and said reinforcing plate.

2. An air bag cover holding structure according to claim 1, wherein said pull-out prevention reinforcing member is provided in at least one of ends of the engaging claws and ends of the engaging portions and has projections and recesses formed to bite into the air bag cover.

3. An air bag cover holding structure according to claim 2, wherein said projections and recesses are formed as a sawtoothed configuration.

4. An air bag cover holding structure according to claim 1, wherein said pull-out prevention reinforcing member is provided on at least one of holding surfaces of said bag holder and holding surfaces of said reinforcing plate and is formed as projections to bite into the air bag cover, each of the holding surfaces of said bag holder facing a respective one of the holding surfaces of said reinforcing p/late with the air bag cover interposed therebetween.

5. An air bag cover holding structure according to claim 4, wherein said projections are formed such that portions of each of the holding surfaces on which the projections are provided are cut and raised.

6. An air bag cover holding structure according to claim 1, wherein said pull-out prevention reinforcing member includes protruding portions formed at an end of each of the engaging portions and engaging holes formed in each of the engaging claws, the protruding portions being respectively provided to pass through through holes formed in the air bag cover and to be inserted in the engaging holes.

7. An air bag cover holding structure according to claim 6, further comprising:

a pull-out preventing member provided in each of the protruding portions to prevent the protruding portions from being pulled out from the engaging holes.

8. An air bag cover holding structure according to claim 7, wherein said pull-out preventing member is formed such that a portion of each of the protruding portions is cut and raised.

9. An air bag cover holding structure according to claim 6, wherein the plurality of protruding portions and the plurality of engaging holes are respectively formed and arranged in each of the engaging portions and the engaging claws along longitudinal directions thereof.

10. An air bag cover holding structure comprising:

a bag holder for fixing an air bag cover to a steering wheel, said bag holder having engaging claws which are respectively engaged with hook-shaped grooves formed on an inner peripheral wall at an open-side end of the air bag cover;

a reinforcing plate fixed in a state of overlapping with said bag holder and having engaging portions, the engaging portions being respectively inserted in plate inserting holes which are formed at the open-side end of the air bag cover in directions of respective hook-shaped grooves so as to hold the air bag cover together with the engaging claws; and pull-out prevention reinforcing projections and recesses provided in at least one of ends of the engaging claws and ends of the engaging portions and formed to bite into the air bag cover to prevent the air bag cover from being pulled out from said bag holder and said reinforcing plate.

11. An air bag cover holding structure according to claim 10, wherein said pull-out prevention reinforcing projections and recesses are formed as a sawtoothed configuration.

12. An air bag cover holding structure comprising:

a bag holder for fixing an air bag cover to a steering wheel, said bag holder having engaging claws which are respectively engaged with hook-shaped grooves formed on an inner peripheral wall at an open-side end of the air bag cover;

a reinforcing plate fixed in a state of overlapping with said bag holder and having engaging portions, the engaging portions being respectively inserted in plate inserting holes which are formed at the open-side end of the air bag cover in directions of respective hook-shaped grooves so as to hold the air bag cover together with the engaging claws; and pull-out prevention reinforcing projections provided on at least one of holding surfaces of said bag holder and holding surfaces of said reinforcing plate and formed to bite into the air bag cover to prevent the air bag cover from being pulled out from said bag holder and said reinforcing plate, each of the holding surfaces of said bag holder facing a respective one of the holding surfaces of said reinforcing plate with the air bag cover interposed therebetween.

13. An air bag cover holding structure according to claim 12, wherein said pull-out prevention reinforcing projections are formed such that portions of each of the holding surfaces on which the projections are provided are cut and raised.

14. An air bag cover holding structure comprising:

a bag holder for fixing an air bag cover to a steering wheel, said bag holder having engaging claws which are respectively engaged with hook-shaped grooves formed on an inner peripheral wall at an open-side end of the air bag cover;

a reinforcing plate fixed in a state of overlapping with said bag holder and having engaging portions, the engaging portions being respectively inserted in plate inserting holes which are formed at the open-side end of the air bag cover in directions of respective hook-shaped grooves so as to hold the air bag cover together with the engaging claws; and a pull-out prevention reinforcing member for preventing the air bag cover from being pulled out from said bag holder and said reinforcing plate, said pull-out prevention reinforcing member including protruding portions formed at an end of each of the engaging portions and engaging holes formed in each of the engaging claws and the protruding portions being provided to pass through through holes formed in the air bag cover and to be inserted in the engaging holes.

15. An air bag cover holding structure according to claim 14, further comprising:

a pull-out preventing member provided in each of the protruding portions to prevent the protruding portions from being pulled out from the engaging holes.

16. An air bag cover holding structure according to claim 15, wherein said pull-out preventing member is formed such that a portion of each of the protruding portions is cut and raised.

17. An air bag cover holding structure according to claim 14, wherein the plurality of protruding portions and the plurality of engaging holes are respectively formed and arranged in each of the engaging portions and the engaging claws along longitudinal directions thereof.

18. An air bag cover holding structure according to claim 17, further comprising:

a pull-out preventing member provided in each of the protruding portions to prevent the protruding portions from being pulled out from the engaging holes.

19. An air bag cover holding structure according to claim 18, wherein said pull-out preventing member is formed such that a portion of each of the protruding portions is cut and raised.

* * * * *